United States Patent [19]

Chen et al.

[11] Patent Number: 4,478,677
[45] Date of Patent: Oct. 23, 1984

[54] LASER INDUCED DRY ETCHING OF VIAS IN GLASS WITH NON-CONTACT MASKING

[75] Inventors: Lee Chen, Poughkeepsie, N.Y.; Tung J. Chuang, Los Gatos, Calif.; Gangadhara S. Mathad, Poughkeepsie, N.Y.

[73] Assignee: International Business Machines Corporation, Armonk, N.Y.

[21] Appl. No.: 564,524

[22] Filed: Dec. 22, 1983

[51] Int. Cl.³ .................. B44C 1/22; C03C 15/00; C03C 25/06
[52] U.S. Cl. ........................ 156/635; 156/345; 156/643; 156/644; 156/646; 156/654; 156/663; 219/121 LJ; 219/121 LL; 219/121 LM
[58] Field of Search ............. 156/635, 643, 644, 646, 156/654, 657, 663, 345; 252/79.1; 427/53.1; 219/121 LH, 121 LJ, 121 LK, 121 LL, 121 FS, 121 LM

[56] References Cited

U.S. PATENT DOCUMENTS

| | | |
|---|---|---|
| 2,841,477 | 7/1958 | Hall ........................... 156/646 |
| 3,095,341 | 6/1963 | Ligenza ..................... 156/646 X |
| 3,364,087 | 1/1968 | Solomon et al. ............ 156/635 |
| 3,374,110 | 3/1968 | Miller ........................ 117/212 |
| 3,429,040 | 2/1969 | Miller ........................ 29/626 |
| 3,495,133 | 2/1970 | Miller ........................ 317/101 |
| 4,027,137 | 5/1977 | Liedtke ..................... 219/121 FS |
| 4,221,047 | 9/1980 | Narken et al. ............ 29/840 |
| 4,245,273 | 1/1981 | Feinberg et al. .......... 361/382 |
| 4,260,649 | 4/1981 | Dension et al. ........... 156/635 X |

FOREIGN PATENT DOCUMENTS 0113329   9/1980   Japan .................. 156/646

OTHER PUBLICATIONS

"A Fabrication Technique for Multilayer Ceramic Modules", H. D. Kaiser et al., Solid State Technology, May 1972, pp. 35–40.

"Laser-Enhanced Chemical Etching of Solid Surfaces", T. J. Chuang, vol. 26, No. 2, Mar. 1982, pp. 145–150, IBM Journal of Research and Development.

"Surface Etching by Laser-Generated Free Radicals", J. I. Steinfeld et al., Journal of the Electrochemical Society, vol. 127, No. 1, Jan. 1980, pp. 514–515.

"Infrared Laser Radiaton Effects on $XeF_2$ Interaction with Silicon", T. J. Chuang, J. Chem. Phys. 74(2), Jan. 15, 1981, p. 1462.

Primary Examiner—William A. Powell
Attorney, Agent, or Firm—T. Rao Coca

[57] ABSTRACT

Disclosed is an apparatus and method for etching a glass substrate by laser induced dry etching. The apparatus features a housing including a vacuum chamber for receiving the substrate; a vacuum pump coupled to the chamber for evacuating the chamber; a gas source coupled to the chamber for supplying a halogen base gas which is capable of wetting the substrate surface and forming a glass etching specie when activated; a laser source for transmitting a light beam of predetermined wavelength and intensity through the gas; and a mask optically coupled to the laser source for patterning the light beam and also coupled to the chamber so that the light patterned by the mask may fall upon the substrate causing excitation thereof and activation of an etch specie for etching the substrate in conformity with the patterned light.

The disclosed method comprises the steps of loading the substrate into a vacuum chamber; evacuating the chamber to a low pressure; controllably introducing a halogen base gas into the chamber to wet substrate surface layer to be etched; and introducing a patterned light beam of predetermined wavelength and intensity through the gas onto the surface layer causing excitation thereof and activation of an etch specie for etching the substrate in conformity with the patterned light.

The laser light may be of the pulse type and of 10.6 microns wavelength in case of a $CO_2$ laser or 249 nanometer or 193 nanometer wavelength in case of an eximer laser.

21 Claims, 4 Drawing Figures

LASER INDUCED DRY ETCHING OF VIAS IN GLASS WITH NON-CONTACT MASKING

DESCRIPTION

Background of the Invention

This invention concerns method and apparatus for dry etching a glass layer. More particularly, the invention concerns method and apparatus for laser exciting a glass layer which in turn activates a halogen base gas to form a reactive species that etches the layer where the light strikes the layer.

The trend in electronics today is to systems of everincreasing component density. Increased component density permits designers to achieve greater speed and complexity of system performance while maintaining system size at a minimum. Additionally, increased component density enables manufacturers to lower production costs owing to the economies that can be realized using integrated circuit processing.

The desire for increased component density has given rise to very large scale integrated (VLSI) circuit. In such circuits, designers pack larger numbers of electrical components onto individual integrated circuit chips. Subsequently, these chips are ganged on a substrate to form larger circuits and functional blocks for the system.

To facilitate the mounting of the high density circuit chips, designers have developed the so-called multilayer ceramic (MLC) substrate. The MLC substrate is well known and has been described in such articles as "A Fabrication Technique for Multilayer Ceramic Modules" by H. D. Kaiser et al, appearing in *Solid-State Technology*, May 1972, pp. 35-40. As Kaiser et al explain in their article, green ceramic sheets, i.e. ceramic powder held together in sheet form by temporary organic binders, are metallized using screen printing, i.e. thick film metallization. The thick film metallized sheets are, thereafter, laminated, and fired to form a monolithic package. This structure enables multichip mounting and provides a three-dimensional wiring system to facilitate the chip interconnection pattern in what was formerly waste or inaccessible space in the ceramic substrate. An example of a semiconductor module including a multilayer ceramic substrate is given in U.S. Pat. No. 4,245,273 issued to Feinberg et al and assigned to IBM Corporation, the assignee of this invention.

MLC manufacturers have found that substrate performance, particularly, the maximum circuit speed the substrate will sustain, can be increased by reducing the length of the thick film metal wiring built into the substrate to interconnect the chips. Designers have proposed to reduce interconnection wiring by replacing at least some of the MLC thick film circuits with multilayer thin film circuits placed at the MLC chip mounting surface. The thin film circuits are formed at the MLC chip mount surface as multiple layers of thin film metal separated by layers of insulation. The multiple metal layers are interconnected by vertical metallization, which extends through holes commonly referred to as vias that are arranged in a predetermined pattern in the intermetal insulation.

Because it is possible to make a line of smaller dimension, e.g. width, using thin film technology as compared with thick film technology, it is possible to fit more circuits in a substrate plane. Where higher circuit density per plane is achieved, fewer planes are required and accordingly the circuit wiring length interconnecting the multiple planes can be reduced. By shortening the plane interconnection metallization less circuit inductance and parasitic capacitance is present permitting the higher frequency performance. This technique for increasing frequency capability has come to be referred to as Thin Film Redistribution (TFR). An illustration of an MLC including a TFR structure is provided in U.S. Pat. No. 4,221,047 issued to Narken et al and assigned to the assignee of this invention.

While the size of TFR multilevel metallization structure is smaller than that of thick film, it is not as small as thin film metallization structure used on the chips. Because the TFR current is a combination of the currents supplied by the multiple chips, it is substantially greater than the chip current. The TFR metallization must therefore be of larger physical size than that of the chip to maintain current densities and associated heating at acceptable levels. Additionally, not only are the metal lines of TFR larger than those of the chip but the dielectric separating the TFR metal layers is also thicker. To minimize parasitic capacitance and retain the increased frequency performance possible with TFR, the insulation separating metal layers is made thick to reduce interlevel coupling.

It is also to be noted that the composition of the insulation used for TFR is somewhat different from that used in a chip. Typically, chip intermetal insulation is substantially pure silicon dioxide. TFR intermetal insulation, on the other hand, is silicon dioxide to which impurities such as oxides of aluminum, calcium, lead and magnesium have been added. These impurities are added in order to obtain physical characteristics such as thermal expansion coefficient compatible with the MLC substrate.

Unfortunately, because TFR metallization structures are larger than those of an I.C. chip and because the materials are somewhat different, the thin film process techniques conventionally used for I.C. chip metallization fabrication cannot be economically used in making TFR structures. For example, while it is well known that wet chemical etching and dry chemical etching can be used to successfully etch vias in chip insulation such as substantially pure silicon dioxide, it has been found that such conventional chip etch techniques are not suitable for TFR. In the case of wet chemical etching, because the TFR glass is thick, e.g. on the order of 10 microns, it is necessary to heat the wet etchant to temperatures of approximately 100° C. to achieve commercially acceptable etch time. Such heating, however, gives rise to difficulties with the mask used to pattern the vias. Particularly, in the presence of a 100° C. temperature the etch mask lifts from the glass surface giving rise to irregular and unacceptably shaped vias.

As for dry etching, because the TFR glass composition includes impurities to render it compatible with the MLC, it is uncertain whether conventional chip dry etching techniques such as reactive ion etching would be successful to form vias. Further, even if reactive ion etch were possible, it is expected that etch rates would be very low and required etch times excessively high rendering the dry etch process commercially unacceptable for TFR application.

It has, however, been reported that high etch rates of various materials can be achieved by using laser induced dry chemical etching. For example, Chuang in his article, "Laser-Enhanced Chemical Etching of Solid Surfaces", *IBM Journal of Research and Development*, Vol. 26, No. 2, March 1982, pages 145-150, reports that silicon and tantalum can be successfully etched by vibrational excitation of $SF_6$ using a $CO_2$ laser.

Additionally, in his above-mentioned article entitled "Laser-Enhanced Chemical Etching of Solid Surfaces", Chuang notes the etching of silicon by dissociation of $SF_6$ using a $CO_2$ laser and the etching of silicon dioxide by dissociation of chlorine gas using an argon laser. See also "Surface Etching by Laser-Generated Free Radicals" by Steinfeld et al, *Journal of the Electrochemical Society*, Vol. 127, No. 1, January 1980, for a description of the etching of $SiO_2$ by the disassociation of $CF_3Br$ using a $CO_2$ laser and the etching of silicon nitride by the disassociation of $CF_2Cl_2$ and $CDF_3$ using a $CO_2$ laser.

While laser induced etching may appear to be an attractive choice for TFR, unfortunately the two types of laser induced etch described, i.e. vibrational excitation of a gas to form an etch specie and the dissociation of a gas to form an etch specie are unsuited for TFR applications.

In both the above-noted techniques of laser induced etching, the action of the etch is isotropic giving rise to both vertical and horizontal etching simultaneously. Additionally, in both the above-noted techniques, it is necessary to provide a mask at the substrate surface in order to restrict the etch to the desired pattern since in both, a cloud of active etch gas is formed above the surface to be etched. These features, i.e. isotropic etching and the need for a substrate contacting mask, are undesirable where a low cost, high accuracy and high etch rate process such as is required for TFR is desired.

Still further, while laser-induced etch processes are known which may overcome the disadvantages of induced vibrational excitation or disassociation of a gas, to date there has been no publication of the constituents of a system suitable for TFR, i.e., the combination of gas, laser projection system and operational parameters suitable for TFR have not been described.

More particularly, Chuang in his article "Laser-Enhanced Chemical Etching of Solid Surfaces" (supra) points out that laser excitation of a surface with a beam can be used to induce gas-solid reaction at the surface, etch causing activation of an etch specie which etches the surface where the laser light strikes it. This technique thus suggests that the need for a contact mask since spacial selectivity can be obtained by patterning the laser light. To date, however, neither has there been any suggestion of the optical system for such purpose nor the combination of gas, laser and operating elements adapted for glass etching and particularly TFR glass. In fact, based on the reported work, it would appear that currently disclosed combinations of gas and laser are unsuited for $SiO_2$.

Particularly, Chuang in his article in *IBM Journal of Research and Development*, supra, noted that a $CO_2$ laser can be used to excite silicon, tantalum and tellurium films so as to selectively activate an etch specie of xenon difluoride gas. However, he reports in his article entitled "Infrared Laser Radiation Effects on $XeF_2$ Interaction with Silicon, *J. Chem. Phys.*, 74(2), Jan. 1981, p. 1462, that xenon difluoride ($XeF_2$) will not react with oxides of silicon, thus suggesting the system he describes as unsuited for silicon dioxide.

SUMMARY OF THE INVENTION

Accordingly, it is an object of this invention to provide apparatus and method for laser induced etching a glass layer by surface excitation.

Additionally, it is an object of this invention to provide apparatus and method for laser induced etching by surface excitation, a glass such as silicon dioxide containing impurities which would be suitable for a thin film redistribution structure as used in a multilayer ceramic chip carrier.

It is a further objective of this invention to provide apparatus and method for laser induced etching a glass layer to form a pattern of holes therein by surface excitation.

It is a still further objective of this invention to provide apparatus and method for laser induced etching by surface excitation a glass layer such as silicon dioxide including impurities therein used in a thin film redistribution structure for a multilayer ceramic chip carrier so as to form vias therein to permit interconnection of the thin film redistribution of metal layers.

Briefly, this invention concerns apparatus and method for laser surface excitation etching of a glass layer as, for example, a layer of silicon dioxide containing impurities as used in a TFR structure.

The apparatus features a housing including a vacuum chamber for receiving the substrate to be etched; a vacuum pump coupled to the chamber such that a vacuum may be drawn in the chamber; a gas source coupled to the chamber for supplying a halogen base gas which is capable of wetting the substrate surface when introduced into the chamber and which is capable of forming a glass etching specie when activated; a light source for transmitting a light beam of a predetermined wavelength and intensity through the gas; and a mask optically coupled to the light source for patterning the light beam and additionally optically coupled to the chamber so that the light patterned by the mask may fall upon the substrate causing excitation thereof and activation of an etch specie that etches the layer in conformity with the patterned light.

In preferred form, where the glass layer is silicon dioxide containing impurities such as oxides of aluminum, calcium, lead and magnesium, the etch gas is xenon difluoride and the light source is either a $CO_2$ laser or an eximer laser. Also, in preferred form, the laser is of pulse type and of a wavelength of 10.6 microns in the case of a $CO_2$ laser and 193 nanometers of 249 nanometers in the case of an eximer laser.

Additionally, in preferred form, the laser source includes optical means such as a lens system for rendering the laser beam of substantially uniform intensity over its cross section and of a diameter substantially equal to the mask pattern, the mask being of the noncontact image type.

Still further, in preferred form, optical means such as a lens system is provided for projecting the mask image through a light port in the housing onto the substrate surface. The light port in preferred form includes a shutter to permit control of light to admitted to the substrate.

Also, in preferred form, the apparatus includes means for adjusting the position of the substrate relative to the mask as, for example, an adjustable table for supporting the chamber which is capable of being adjusted in the X, Y, and Z directions.

The method in accordance with this invention features steps for loading the substrate into a vacuum chamber; evacuating the chamber to a low pressure; controllably introducing a halogen base gas into the chamber so as to wet the glass surface layer to be etched and thereafter introducing a patterned light of predetermined wavelength and intensity through the gas and onto the surface of the layer to be etched so as to excite the surface where the light impinges causing the gas that wets the layer surface to form an active specie which etches the layer in conformity with the pattern.

In preferred form, where the layer to be etched is silicon dioxide containing impurities such as oxides of aluminum, calcium, lead and maganese, the gas is xenon difluoride and the light source is a $CO_2$ or eximer laser which has been patterned with non-contact mask corresponding to the pattern to be etched. Additionally, in preferred form, the laser light is applied in pulse form and of 10.6 microns wavelength in the case of the $CO_2$ laser and 193 nanometer or 249 nanometer wavelength in the case of an eximer laser.

Additionally, in preferred form, the chamber is evacuated to a pressure of approximately $10^{-6}$ torr and xenon difluoride is thereafter controllably introduced into the chamber until the chamber reaches a pressure of approximately $10^{-2}$ torr. Subsequently, the patterned light is permitted to fall upon the substrate so as to etch the substrates for a desired period. Thereafter, the light is removed.

BRIEF DESCRIPTION OF THE DRAWINGS

The above and other objectives and advantages of this invention will be better understood with reference to the following detailed description of the invention read in conjunction with the accompanying figures in which.

DETAILED DESCRIPTION OF THE INVENTION

Preferred Embodiment

As noted above, to increase system speed and functional capability, equipment designers pack large numbers of circuit components onto large scale integrated circuit chips and thereafter gang mount such chips on multilayer ceramic (MLC) chip carriers. The MLC provides both mounting sites for the chips and a wiring system to supply power, signal and ground connections between and among the chips external to the MLC. An illustration of a conventional MLC assembly with chips is shown in U.S. Pat. No. 4,245,273 supra. Also, as noted above, to enhance MLC performance, for example the maximum frequency the MLC will support, designers use thin film redistribution structures (TFR) to reduce the length of interconnections and associated parasitic inductance and capacitance. An illustration of an MLC with a TFR structure thereon is provided in U.S. Pat. No. 4,221,047 supra.

As explained, TFR is a system of thin film metallization separated by layers of intermetal insulation. Conventional interconnection lines fabricated in MLC using thick film technology are typically 30–40 microns wide spaced 60–80 microns between centers. With TFR thin film techniques, line widths on the order of 10–15 microns spaced approximately 10–15 microns between centers can be realized. This represents on the order of a 300% potential increase in circuit density.

Figure 1:
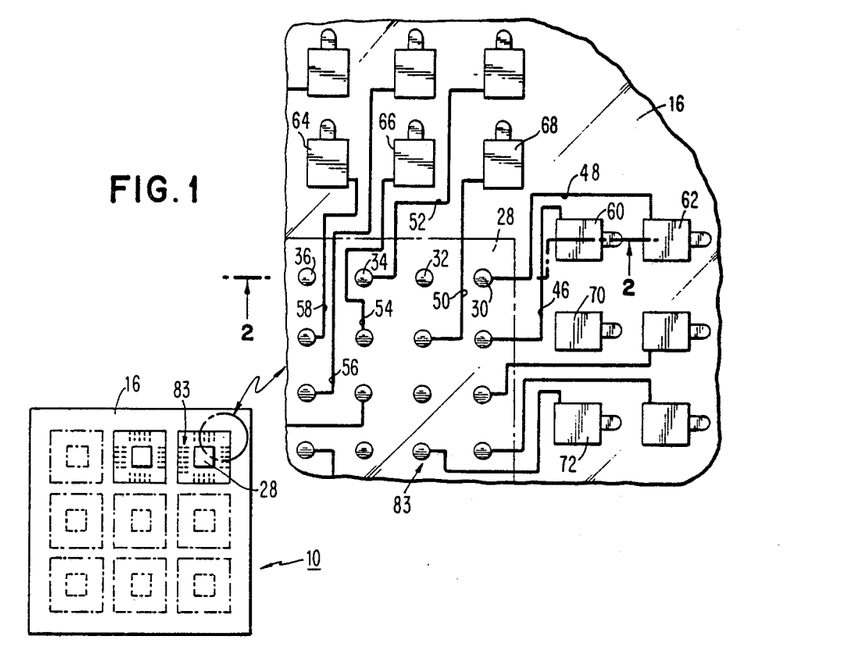
FIG. 1 is a top view and fragment thereof of an MLC chip carrier having a TFR structure thereon.
Figure 2:
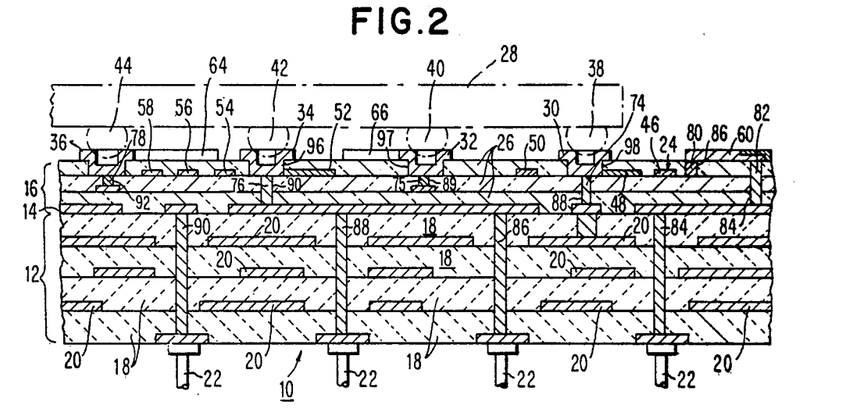
FIG. 2 is a fragmented cross-section of an MLC including a TFR structure shown in FIG. 1 taken along section line 2—2.

An illustration of a chip carrier including a TFR structure is shown in FIGS. 1 and 2. As best seen in FIG. 2, carrier 10 includes an MLC body element 12 having a principal surface 14 at which a TFR structure 16 is provided. As shown, MLC body element 12 includes a plurality of ceramic laminations 18, each of which includes a pattern of thick film interconnection lines 20. Continuing with reference to FIG. 2, MLC body element 12 also includes a plurality of pins 22 for connecting the carrier to external circuits which provide power and signal to the carrier. As shown in FIG. 2, TFR structure 16 includes a plurality of thin film circuits 24 separated by layers of insulation 26. At the surface of the TFR structure the TFR metallization includes chip mounting sites, for example, 30, 32, 34, 36, for receiving and retaining alloy solder balls 38, 40, 42, 44, respectively. Solder balls 38 to 42 enable flip chip mounting of an IC chip 28 shown fragmented. Chip 28 is mounted with a conventional solder reflow process as described in U.S. Pat. No. 3,374,110; 3,429,040; 3,495,133 to Miller and assigned to the assignee of this application.

As seen in FIGS. 1 and 2, the TFR metallization 24 includes lines for fanning out the chip mount sites, for example 46 to 58, for connection to engineering change pads, e.g., 60 to 72. The change pads permit adjustment of the chip connections to facilitate reconnection in the event of defects in either chip or carrier circuits or desired engineering changes. TFR fanout lines, e.g., 46 to 58, as well as vertical metallization, e.g., 74 to 82, which constitutes TFR metallization 24, facilitate the spacial transformation of the dense chip mount pattern 83 best seen in the fragmented portion of FIG. 1 to a larger size to accommodate the referred to changes and subsequent circuit connections as is well known.

As best seen in FIG. 2, chip metallization 24 includes in addition to horizontal fan out lines, e.g., 46 to 58, vertical fan out lines, e.g. 74 to 82, for interconnecting chip mount sites, e.g., 30 to 36, and change pads, e.g. 60 to 72 to other levels 24 of the TFR metallization and to the MLC metallization, e.g., 20, 84 to 90.

To facilitate placement of the vertical TFR metallization and the chip mount sites, holes, commonly referred to as vias, e.g., 84 to 90, are formed in a predetermined pattern in the TFR insulating layers 26. The vias are formed in insulating layer 26 by etching.

Because of the TFR high line density (10 to 15 micron line widths spaced 10 to 15 microns between centers) placement and alignment of the vias become critical to successful fabrication of the TFR structure. Improper via location, for example, can result in a failure to connect TFR metal layers causing open circuits or undesired line connection producing short circuits. Such defects at best require engineering changes which are time consuming and costly and at worst require the entire chip carrier to be discarded.

Accordingly, the process for making vias must be accurate. Additionally, because many vias are required to be of substantial depth, the process must also form the vias in a time short enough to be commercially acceptable. These objectives are difficult to realize in TFR because of the substantial thickness of the TFR insulation, typically 10 microns. The problem is aggravated by the insulation composition which as pointed out above is silicon dioxide containing impurities such as oxides of aluminum, calcium, lead and magnesium. As noted, the thickness and composition of TFR insulation are such that they meet the requirements of electrical (e.g. low capacitance) and mechanical (e.g., thermal expansion coefficient) compatibility with the MLC substrate.

As explained, because of the size and composition of the TFR insulation, conventional integrated circuit techniques for making high density, high accuracy vias are not suitable for TFR applications. While vias have long been formed in integrated circuit chip insulation by, for example, HF wet etching or reactive ion dry etching, these processes are unsuited for TFR. The thickness of TFR metallization requires HF etching to be carried out at elevated temperatures to be practical. The elevated wet etch temperatures unfortunately have been found to distort the required contact etch mask resulting in inaccurate and commercially unacceptable vias. Additionally, in the case of dry etch as noted, if they could be used at all for the doped TFR insulation, it is expected that excessive time would be required rendering such processes commercially unacceptable.

In accordance with this invention, it has been found that accurate and deep vias can be formed in TFR insulation within a commercially acceptable time with the use of laser induced surface excited dry etch. Further, because the laser induced surface excited dry etch is spacially selective, it can be carried out with non-contact masking, thereby rendering this type of etch even more attractive for a TFR application.

While as noted, laser induced dry etching is known from Chuang's March 1982 *IBM Journal of Research and Development* article referred to hereinabove, difficulties such as an isotropic character of the etch and need for a contact mask render laser-induced vibrational excitation and disassociation of an etch gas unsuited for TFR applications. Additionally, and as noted while it is generally known from Chuang's March 1982 *IBM Journal of Research and Development* article that laser excitation of a surface can be used to induce a gas-solid reaction at a surface, it was not known what kind of system, i.e. laser, gas conditions, etc., would be successful to etch silicon dioxide or doped silicon dioxide and in fact whether silicon dioxide could be etched in this manner at all in view of Chuang's January 1981 article in *J. Chem. Phys.* supra where he reports that the proposed xenon difluoride gas would not react with silicon dioxide.

In a laser induced surface excited etch, it is believed the photons constituting the laser beam sufficiently excite the substrate so as to weaken the bonds of surface atoms. Additionally, it is believed that if a gas capable of forming an etch specie is brought in close proximity to the substrate surface, i.e., wets the substrate surface, the gas will react with the excited surface and etch it.

Accordingly, for a successful etch system, it is necessary to select a laser of a type capable of sufficiently exciting the substrate desired to be etched and further selecting a gas which is capable of being converted to an etch specie by a substrate so excited.

In accordance with this invention, it has been found that TFR insulation as, for example, silicon dioxide containing oxides of aluminum, lead, calcium and magnesium (hereafter referred to as TFR doped silicon dioxide) can be accurately etched in acceptably short times with a laser-induced surface excited etch system that features a halogen base gas such as $XeF_2$, $XeF_4$, HF or $F_2$ and a compatible laser such as a pulsed $CO_2$ or pulsed eximer laser.

Figure 3:
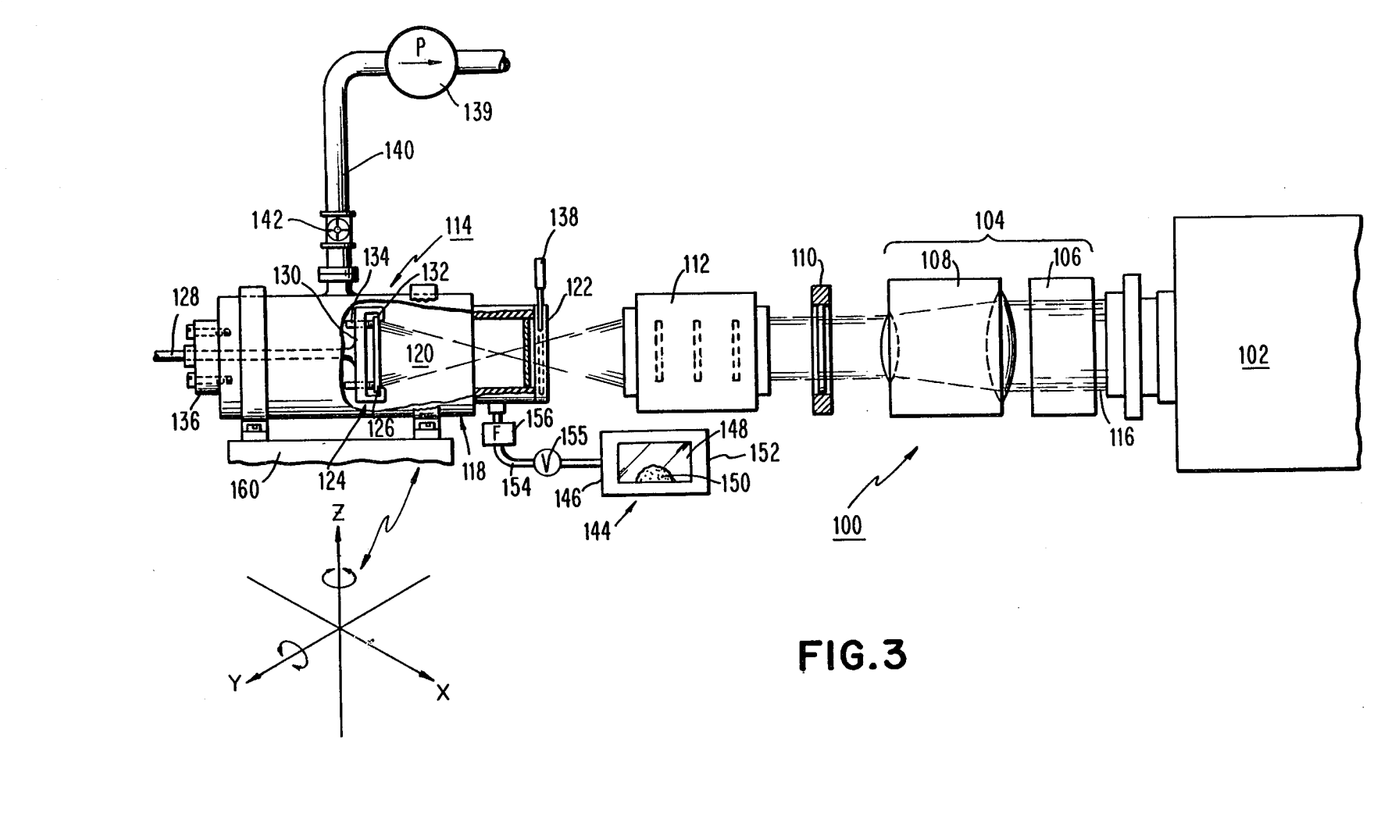
FIG. 3 is a diagramatic representation of the apparatus for etching a glass layer in accordance with this invention.

The elements of the etched system of this invention are shown in FIG. 3. As seen, system 100 includes a laser 102, laser beam modifier 104, a mask 110, a mask image projector 112 and a vacuum chamber system 114.

As noted, laser 102 is used to sufficiently excite the surface to be etched as to cause it to react with the etch gas. Where the surface to be etched is TFR doped silicon dioxide, it has been found possible to use a pulsed $CO_2$ laser of 10.6 micron wavelength, a pulsed eximer laser of 249 nanometer wavelength or a pulse eximer laser of 193 nanometer wavelength where xenon difluoride is the etch gas. More particularly, it has been found possible to obtain an etch rate in TFR doped silicon dioxide of one to two microns per second using xenon difluoride at a pressure of $10^{-2}$ torr. and a pulse eximer laser of 249 or 193 nanometer wavelength. To realize this etch rate, the laser beam intensity for either the 249 nanometer or 193 nanometer wavelength is set at one mega watt/$cm^2$ with the pulse width at fifteen nanoseconds and the repetition rate at fifty pulses per second.

When $XeF_2$ is at a pressure of $10^{-2}$ torr. and a pulse $CO_2$ laser of 10.6 micron wavelengths are used, an etch rate in TFR doped silicon dioxide of 500 Å/second has been realized; the laser intensity being set at ten mega watts/$cm^2$ and the pulse width and pulse repetition rate being set at 100 nanoseconds and 50 pulses per second respectively.

The pulsed $CO_2$ and pulsed eximer lasers above described are of conventional type and are commercially available from Lumonics Inc. and Lamda Physik, Inc., respectively.

Continuing with reference to FIG. 3, as shown, laser 102 generates a beam 116 which enters beam modifier 104. Beam modifier 104 itself includes a beam scrambler 106 and beam shaper 108. Beam scrambler 106 is used to render the intensity of the laser beam uniform across its diameter. Lasers typically produce beams having a Gaussian intensity distribution across their diameter. If this non-uniform intensity were to be projected to the substrate, the etch rate realized across the substrate would likewise be non-uniform. Accordingly, since uniformity of etch is desired, the beam is scrambled, i.e., rendered uniform. It should be noted that certain lasers are equipped with means for rendering their beams uniform. In such case, beam scrambler 106 may be eliminated.

Beam shaper 108 is used to transform the shape and size of the laser beam to that of mask 110. This is done in order to utilize the full power available from the laser, i.e., minimize light scattering and thereby improve system operating efficiency. Additionally, in some cases the beam cross section may be square where a beam of circular cross section is desired.

Both beam scrambler 106 and shaper 108 are conventional type and readily available commercially. As will be appreciated by those skilled in the art, scrambler 106 and shaper 108 are selected to be compatible with, i.e., transmit without substantial loss, the system laser beam.

Once laser beam 116 is rendered uniform and shaped, it is passed through system mask 110 to pattern beam 116's cross section. As noted, one of the advantages of a surface excited laser etched system is that the patterning mask can be non-contact, i.e., displaced from the substrate to be etched.

Since the etch gas will be activated only where light strikes the substrate, it is not necessary to shield, i.e., mask, portions of the substrate not to be etched from the surrounding gas. Since no light strikes this area, significant etch action will not arise. This feature has great cost saving implications. It permits use of a single master mask and avoids the cost, time and difficulty associated with applying an individual contact mask to each of the substrates to be etched.

Mask 110 is of conventional type having a transparent body upon which an opaque pattern is formed. The opaque pattern corresponds to the areas of the substrate not to be etched. The opaque pattern may be formed in any conventional manner as, for example, by photolithographically patterning a layer deposited on the mask body. Like the elements of the beam modifier 104, mask 110 is selected to be compatible with the system laser light. That is to say, the transparent mask body is selected to transmit the system laser beam without significant intensity loss. Where the laser used is 10.6 micron wavelength $CO_2$ laser, a mask body of zinc sellinide may be used. Where the laser is a 249 nanometer eximer laser, the mask body can be quartz and where the laser is 193 nanometer eximer laser, the mask body can be lithium fluoride.

Once laser beam 116 is patterned by mask 110, the beam is projected to the substrate to be etched by projector 112. Projector 112 can be of any conventional type as, for example, a lens system as shown in FIG. 3, or a mirror system as is well known in the art. As in the case of the other optical components of the system, projector 112 is selected to be compatible with the system laser. As will be appreciated by those skilled in the art, while the system shown in FIG. 3 uses a projector to transfer the mask image to the surface of the substrate the projector could be eliminated if the mask were located in proximity to the substrate, i.e., within vacuum chamber system 114.

As seen in FIG. 3, etch system 100 also includes a vacuum chamber system 114. As shown, chamber system 114 includes a housing 118 having a cylindrical process chamber 120 for receiving the substrate to be etched. Also seen in FIG. 3, housing 118 is provided with a window 122 aligned with the axis of laser beam 116. Window 122 permits projection of beam 116 axially into chamber 120.

Within chamber 120, a substrate mounting fixture 124 is provided for receiving and positioning substrate 126, similar to the substrate shown in FIG. 2 to be etched. As shown, fixture 124 includes a mounting rod 128 attached to a substrate receiving platform 130. Platform 130 is provided with a reference face 132 and means, as for example, set screws 134, for biasing substrate 126 against reference face 132. This arrangement permits placement of substrate 126 perpendicular to the axis of laser beam 116 within process chamber 120.

Continuing with reference to FIG. 3, mounting rod 128 extends rearwardly from receiving plate 130 and is slidably and sealably received coaxially in removable rear housing wall 136. Rod 128 is made axially movable in chamber 120 so that substrate 126 can be placed at the focus of projector 112. This permits sharper focus of the image of mask 110 at substrate 126. As would be appreciated by those skilled in the art, sharp focus of the light pattern leads to a more well defined etch.

Continuing with reference to FIG. 3, housing 118 is also provided with a shutter 138 at window 122. Shutter 138 permits interruption of the laser beam 116 admitted to chamber 120 and substrate 126 therein, so that the laser light may be controllably introduced.

Chamber system 114 additionally includes a vacuum pump 139 coupled to housing 118 by conduit 140 and valve system 142. Vacuum pump 139 is provided to permit the drawing of a vacuum within chamber 120. Pump 139 may be of a conventional type and in preferred form is capable of establishing and maintaining a vacuum of $10^{-7}$ torr. within process chamber 120. This capability assures that contaminants can be withdrawn prior to initiation of the etch.

Chamber system 114 yet further includes a gas source 144 coupled to chamber 120 for supplying a gas capable of wetting the surface of the substrate to be etched 126, which gas is further capable of forming an etch specie when the surface is excited by laser beam 116. While gas source 144 may take any convenient form, e.g. cylinders, reservoirs, etc., it has been found preferable where the gas to be used is $XeF_2$ to configure source 144 as a housing 146 having a chamber 148 to which a charge of solid $XeF_2$ 150 may be added. To facilitate loading, an access door 152 is provided in housing 146 as shown in FIG. 3.

Gas source 144 is coupled to process chamber 120 by a valved conduit 154 so that when a vacuum is created in chamber 120 and the source valve 155 is open, solid source 150 will sublimate and permit gaseous $XeF_2$ to be drawn into process chamber 120. A flow meter 156 is provided in conduit 154 to monitor the flow of gas into process chamber 120.

As shown in FIG. 3, housing 118 may be mounted on a movable table 160 to permit X, Y and Z movement of housing 118 and substrate 126 relative to laser beam 116. The movable table 160 is provided in order to permit alignment adjustments between the substrate and the laser beam.

In operation, substrate 126 is mounted at receiving platform 130 and loaded into process chamber 120 with window shutter 138 closed. Following the sealing of chamber 120, pump 139 is activated to evacuate housing 118. On establishing the desired vacuum, the source valve 155 is opened permitting the $XeF_2$ to sublimate and enter chamber 120 to where it wets and surrounds substrate 126. As the $XeF_2$ gas flows into process chamber 120, the chamber pressure rises. When chamber pressure reaches a predetermined value, the pressure is stabilized.

Thereafter, laser 102 is activated and stabilized while housing window shutter 138 remains closed. Once the xenon difluoride gas pressure and laser 102 fully stabilize, the window shutter 138 is opened and substrate 126 and $XeF_2$ etched gas are exposed to the patterned laser light causing substrate 126 to be etched. As will be appreciated by those skilled in the art, since the laser light must penetrate the gas cloud to excite the substrate, the gas must be selected to not only form an etch specie which is activated by the excited surface, but also not excessively absorb the laser light.

Following a predetermined etch time, the laser is deactivated and the process chamber flushed. Following flushing, the etched substrate is removed from chamber 120 and receiving platform 130.

This invention also contemplates a preferred method for etching a glass layer as, for example, a TFR doped silicon dioxide layer. Generally, the method includes the steps of mounting the substrate to be etched in a vacuum chamber; establishing in the chamber a vacuum of predetermined value; controllably introducing a gas which remains in close proximity to the substrate surface and which is capable of forming a substrate etching specie when activated by the substrate where the substrate has been light excited; and thereafter introducing a light of predetermined energy, e.g. wavelength, intensity, etc. that has been patterned, which light irradiates the substrate through the gas so as to excite the substrate and activate the gas to etch the substrate only where the patterned light strikes the substrate.

In preferred form, the gas is a halogen base gas and the light is a laser beam. In particular, where the substrate to be etched is silicon dioxide containing oxides of aluminum, calcium, lead and magnesium the gas is preferably xenon difluoride ($XeF_2$) and the laser light, light from a pulsed $CO_2$ laser of 10.6 micron wavelength or a pulsed eximer laser of 249 nanometer wavelength or an eximer laser of 193 nanometer wavelength.

In accordance with preferred form of the method, when the substrate is introduced into the vacuum chamber, the chamber is evacuated to a pressure of approximately $10^{-7}$ torr. so as to remove any contaminants as, for example, water vapor. Thereafter, $XeF_2$ is introduced into the vacuum chamber as, for example, by sublimating an amount of solid $XeF_2$. The xenon difluoride is admitted until a pressure of approximately $10^{-2}$ torr. is realized. Thereafter the vacuum chamber is maintained at approximately the $10^{-2}$ torr. pressure.

Following introduction of and wetting of the substrate by $XeF_2$, the substrate is irradiated with the patterned laser light. Where the laser light is produced by a pulsed eximer laser of 249 or 193 nanometer wavelength, the laser beam intensity is preferably maintained at 1 mega watt/$cm^2$ and the pulse width and pulse repetition rate of the laser beam maintained at fifteen nanoseconds and fifty pulses per second, respectively.

Where the laser light is provided by a pulsed $CO_2$ laser of 10.6 micron wavelength, the laser beam intensity is preferably maintained at 10 mega watts/$cm^2$ and the pulse width and repetition rate of the laser beam is maintained at one hundred nanoseconds pulse width and fifty pulses per second repetition rate.

In preferred form, the laser light may be patterned with a non-contact mask of conventional type, the image of which may be projected to the substrate to be etched by means of a lens or mirror system. In the alternative, the mask may be located in proximity to the substrate and the projection system dispensed with.

Figure 4:
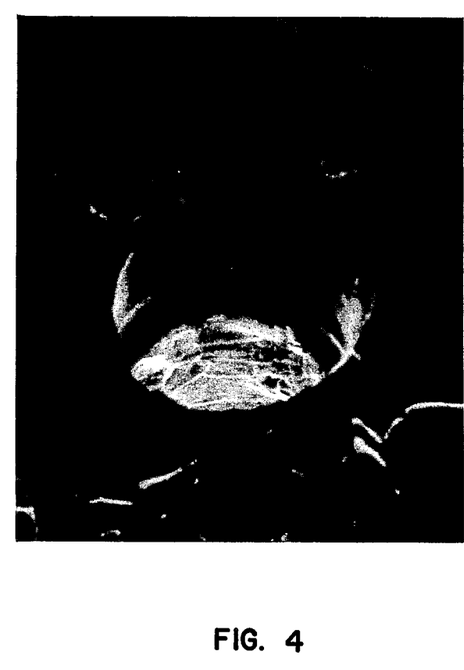
FIG. 4 is a scanning electron micrograph of a via formed in a TFR glass layer in accordance with this invention.

FIG. 4 shows a micrograph of a via produced in accordance with this invention. As seen in FIG. 4, the via which is approximately one hundred microns in diameter, having a depth of ten microns is of uniform geometry. These results indicate the effective selectivity and process control capable of being realized with a surface excited laser induced dry etch process.

While the method and apparatus of this invention have been described in preferred form, it would be appreciated by those skilled in the art that the elements and steps described may be modified without departing from the spirit and scope of the invention.

We claim:

1. Apparatus for dry etching a glass layer, comprising:
   a. a gas source for supplying a halogen base gas which wets the surface of the glass layer to be etched and which is capable of forming a glass etching specie when activated;
   b. a light source for providing a light beam of predetermined wavelength and intensity;
   c. a mask optically coupled to the light source for patterning the light beam cross section;
   d. a vacuum pump; and
   e. a housing for receiving the glass layer, the housing being coupled to the light beam and connected to the gas source and vacuum pump so that the patterned light beam may be caused to fall upon the glass layer causing excitation thereof and activation of an etch specie which etches the layer in conformity with the patterned light where the gas wets and the light strikes the layer surface.

2. Apparatus in accordance with claim 1 wherein the layer to be etched is silicon dioxide containing impurities selected from the group including oxides of aluminum, lead, calcium and magnesium and the gas source is capable of supplying xenon difluoride gas.

3. Apparatus in accordance with claim 2 wherein the housing includes a chamber for receiving the layer, the chamber being coupled to the gas source and the vacuum pump such that an atmosphere of gas surrounds and wets the layer surface to be etched, the housing also including an optical port coupled to the light source and the chamber so that light may be directed to the layer surface to be etched.

4. Apparatus in accordance with claim 3 wherein the mask is of the non contact type located externally of the housing.

5. Apparatus in accordance with claim 3 wherein the housing includes means for aligning the layer surface to be etched with the mask.

6. Apparatus in accordance with claim 3 wherein the light source is an eximer laser having a wavelength of 193 nanometers.

7. Apparatus in accordance with claim 3 wherein the light source is an eximer laser having a wavelength of 249 nanometers.

8. Apparatus in accordance with claim 3 wherein the light source is a carbon dioxide laser having a wavelength of 10.6 microns.

9. The apparatus of claim 3 wherein the housing further includes a shutter at the optical port.

10. Apparatus in accordance with claim 6, 7 or 8 wherein the apparatus includes a lens system optically coupled to the laser light source for rendering the laser beam of uniform intensity over its cross section and diameter compatible with the mask and means for projecting the mask image onto the surface to be etched.

11. The apparatus of claims 6, 7 or 8 wherein the laser light source is of the pulse type.

12. Apparatus in accordance with claim 9 further including means for aligning the mask with the surface of the layer to be etched.

13. A method for dry etching a glass layer, the method comprising the steps of:
   a. mounting the glass layer to be etched in a vacuum chamber;
   b. establishing a vacuum in the chamber;
   c. controllably introducing a halogen base gas mixture into the chamber to wet the glass layer surface to be etched;

d. imaging a light beam of predetermined wavelength and beam pattern through the gas and onto the surface of the layer to be etched to excite the layer where the light impinges so as to activate the gas that has wet the layer surface to form an etch specie which etches the layer surface in conformity with the beam pattern.

14. The method of claim 13 wherein the light beam is patterned with a non-contact mask and the mask is aligned with the layer to be etched.

15. The method of claim 14 wherein the glass layer is silicon dioxide containing impurities selected from the group including oxides of aluminum, calcium, lead and magnesium and the gas introduced is xenon difluoride.

16. The method in accordance with claim 15 wherein the chamber is initially pumped to a vacuum of between approximately $10^{-6}$ to $10^{-7}$ torr., thereafter backstreaming the gas into the chamber until the chamber reaches a reaction pressure of approximately $10^{-2}$ torr., exposing the substrate to the patterned light beam for a predetermined time and thereafter removing the light beam from the layer to terminate etch.

17. The method of claim 16 wherein the light imaged on the layer to be etched has a wavelength of approximately 193 nanometers and an intensity of approximately 1.0 megawatt/cm$^2$.

18. The method of claim 16 wherein the light imaged on the layer to be etched has a wavelength of approximately 249 nanometers and an intensity of approximately 1.0 megawatts/cm$^2$.

19. The method of claims 17 or 18 wherein the light imaged at the surface to be etched is applied as a pulse having a width of approximately 15 nanoseconds and a repetition rate of approximately 50 pulses per second.

20. The method of claim 16 wherein the light imaged on the layer to be etched has a wavelength of approximately 10 microns and an intensity of approximately 10 megawatts/cm$^2$.

21. The method of claim 20 wherein the light imaged at the surface to be etched is applied as pulses having a width of approximately 100 nanoseconds and repetition rate of approximately 50 pulses per second.

* * * * *